United States Patent
Oka et al.

(10) Patent No.: US 7,403,404 B2
(45) Date of Patent: Jul. 22, 2008

(54) POWER INVERTER SYSTEM AND METHOD OF CORRECTING SUPPLY VOLTAGE OF THE SAME

(75) Inventors: Toshiaki Oka, Tokyo (JP); Akihiko Kuroiwa, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 212 days.

(21) Appl. No.: 11/288,115

(22) Filed: Nov. 29, 2005

(65) Prior Publication Data

US 2006/0215429 A1    Sep. 28, 2006

(30) Foreign Application Priority Data

Mar. 23, 2005    (JP)    ............... 2005-084892

(51) Int. Cl.
*H02M 1/12* (2006.01)
*H02P 27/04* (2006.01)

(52) U.S. Cl. ............... 363/40; 318/802; 318/807

(58) Field of Classification Search ............ 363/40, 363/41, 45, 97; 318/807, 802, 809, 729, 318/811, 801
See application file for complete search history.

(56) References Cited

U.S. PATENT DOCUMENTS

| | | | | |
|---|---|---|---|---|
| 3,839,667 A | * | 10/1974 | King .................... | 363/40 |
| 5,013,974 A | * | 5/1991 | Nilssen ................ | 315/244 |
| 5,189,357 A | * | 2/1993 | Woodson et al. ....... | 318/737 |
| 5,349,517 A | * | 9/1994 | Brennen ................ | 363/40 |
| 6,388,416 B1 | * | 5/2002 | Nakatani et al. ....... | 318/700 |
| 6,614,202 B2 | * | 9/2003 | Edelson ................ | 318/727 |
| 6,710,495 B2 | * | 3/2004 | Lipo et al. ............ | 310/184 |
| 6,831,440 B1 | * | 12/2004 | Royak et al. .......... | 318/727 |
| 2002/0057125 A1 | | 5/2002 | Demizu | |
| 2002/0131285 A1 | | 9/2002 | Kawakami | |

FOREIGN PATENT DOCUMENTS

WO    WO 03/010877    2/2003

OTHER PUBLICATIONS

The New Drive Electronics Tokyo: Denkishoin, 1984, Paragraph 6-2-4, pp. 203-206 (with English translation).

* cited by examiner

*Primary Examiner*—Jeffrey L. Sterrett
*Assistant Examiner*—Harry Behm
(74) *Attorney, Agent, or Firm*—Oblon, Spivak, McClelland, Maier & Neustadt, P.C.

(57) ABSTRACT

In a power inverter system, an inverter unit includes first to third single-phase inverters. In the power inverter system, a reference-frequency calculating unit calculates a reference frequency of each of the first to third single-phase inverters. A reference-voltage-calculating unit calculates a reference voltage of each of the single-phase inverters. In the power inverter system, a voltage-correcting unit adds a correction voltage to the reference voltage calculated by the reference voltage-calculating unit. The correction voltage has a frequency three times as high as the reference frequency.

5 Claims, 13 Drawing Sheets

POWER INVERTER SYSTEM AND METHOD OF CORRECTING SUPPLY VOLTAGE OF THE SAME

CROSS REFERENCE TO RELATED APPLICATION

This application is based on Japanese Patent Application 2005-084892 filed on Mar. 23, 2005. This application claims the benefit of priority from the Japanese Patent Application, so that the descriptions of which are all incorporated herein by reference.

BACKGROUND OF THE INVENTION

1. Field of the Invention

The present invention relates to power inverter systems and methods of correcting supply voltage of such power inverter systems, which are capable of inverting an independent direct current (DC) voltage of each phase into multiphase (polyphase) alternative current (AC) power with variable voltage and frequency.

2. Description of the Related Art

Conventional multilevel inverter systems for reducing higher-order components and/or the threshold voltage of switching elements include single-phase inverter systems, inverter systems with three-phase star-connected single-phase multilevel inverters, and multilevel inverter systems with three-phase star-connected inverter units each of which has cascade-connected inverters.

FIG. 13 discloses a multilevel inverter with single-phase inverters 1U, 1V, and 1W that are three-phase star-connected to an AC motor 2. The inverter shown in FIG. 13 is operative to supply AC power with variable frequency and voltage from its output terminals U, V, and W to the AC motor 2.

An example of a control circuit for such multilevel inverters having a circuit structure as illustrated in FIG. 13 is disclosed in paragraph 6.2.4 of the *New Drive Electronics*. Tokyo: DENKISHOIN, 1984.

The control circuit is operative to separate a current to be supplied to an induction motor into a torque current component and a field current component (an exciting current component) and to independently control the torque current component and the field current component.

As illustrated in FIG. 13, when a single-phase inverter has a DC power source so that a DC voltage is independent for each phase, DC voltage ripples occur due to momentary power of each phase. These DC voltage ripples cause an output current from the single-phase inverter to become distorted from the original waveform (sinusoidal waveform).

The magnitude of ripples appearing in the DC voltage depend on a relationship between reactive power based on the output current from the single-phase inverter and reactances of reactive components, such as a smoothing capacitor and a power-source side reactor, of the single-phase inverter.

When the momentary power of a single-phase inverter is positive and the DC voltage is lower than a no-load voltage, the output power of the single-phase inverter should depend on the DC voltage supplied from the power source side thereof. However, if the reactance of the power-source side reactor is comparatively high, because the current to be supplied to the smoothing capacitor is delayed, the output power of the single-phase inverter depends on the energy charged in the smoothing capacitor. This causes the DC voltage to drop off severely.

In contrast, if the momentary power of the single-phase inverter is negative, a current based on the DC voltage supplied from the power source side flows through the smoothing capacitor so that the smoothing capacitor is charged. In this case, when the reactance of the power-source side reactor is comparatively high, even if the DC voltage is higher than the no-load voltage, the current keeps flowing through the smoothing capacitor with the DC voltage maintained higher than the no-load voltage.

That is, DC voltage ripples occur depending on the positive and negative variations of the momentary power of the single-phase inverter.

A frequency of the DC voltage ripples is proportional to a reactive power component of the output power. Specifically, the DC voltage ripples have a frequency, which is double the frequency of the fundamental of the output voltage or the output current.

If the frequency of the DC voltage ripples is sufficiently higher than a resonance frequency of the power side reactor and the smoothing capacitor, in other words, if the phase velocity of the DC voltage ripples is faster than the charge and discharge speed of each the power side reactor and the smoothing capacitor, the magnitude of the DC voltage ripples can be reduced.

In order to reduce the magnitude of the DC voltage ripples, comparatively high reactance of the power-source side reactor of each single-phase inverter and comparatively high capacitance of the smoothing capacitor thereof may be required, which can reduce the resonance frequency of the power-source side reactor and the smoothing capacitor of each single-phase inverter. Otherwise, it may be necessary to set the frequency of the no-load voltage of each single-phase inverter to be higher than the resonance frequency of the power-source side reactor and the smoothing capacitor of each single-phase inverter.

An increase of the reactance of the power-source side reactor of each single-phase inverter may however contribute to an increase of the DC voltage drop, deteriorating the power conversion efficiency of the power inverter system. Using a capacitor with a comparative high capacitance as the smoothing capacitor of each single-phase inverter may cause the circuit size of each single-phase inverter and the cost thereof to increase.

SUMMARY OF THE INVENTION

The present invention has been made improving on the background art such that preferable embodiments of the present invention are capable of reducing the magnitude of DC voltage ripples without increasing reactances of reactive components of each single-phase inverter.

According to one aspect of the present invention, there is provided a power inverter system including an inverter unit including first to third single-phase inverters. Each of the first to third single-phase inverters includes a direct current power source, a smoothing circuit connected in parallel to the direct current power source, and a plurality of switching elements connected in parallel to the direct current power source. The power inverter system includes a reference-frequency calculating unit configured to calculate a reference frequency of each of the first to third single-phase inverters, and also includes a reference voltage-calculating unit configured to calculate a reference voltage of each of the single-phase inverters. The power inverter system further includes a voltage-correcting unit configured to add a correction voltage to the reference voltage calculated by the reference voltage-calculating unit, the correction voltage having a frequency three times as high as the reference frequency.

According to another aspect of the present invention, there is provided a power inverter system including an inverter unit. The inverter unit has first to third single-phase inverters. Each of the first to third single-phase inverters includes a direct current power source, a smoothing circuit connected in parallel to the direct current power source, and a plurality of switching elements connected in parallel to the direct current power source. The power inverter system includes a reference current setting unit configured to set a first reference current command value representing a first reference current component in a first axis, and a second reference current command value representing a second reference current component in a second axis. The first axis and the second axis are orthogonal to each other.

The power inverter system according to another aspect of the present invention also includes a reference-frequency calculating unit configured to calculate a reference frequency of each of the first to third single-phase inverters. The power inverter system includes a first converter configured to convert first to third output currents from the first to third single-phase inverters into a first current command value representing a first output current component in the first axis and a second current command representing a second output current component in the second axis. The power inverter system includes a first subtracter configured to subtract the first current command value from the first reference current command value, and a second subtracter configured to subtract the second current command value from the second reference current component. The power inverter system includes a first current control amplifier configured to adjust a first voltage command value representing a first voltage component in the first axis such that the difference between the first reference current command value and the first current command value is reduced to zero based on the subtraction result by the first subtracter. The power inverter system includes a second current control amplifier configured to adjust a second voltage command value representing a second voltage component in the second axis such that the difference between the second reference current command value and the second current command value is reduced to zero based on the subtraction result by the second subtracter. The power inverter system includes a second converter configured to convert the first and second voltage command values into first-phase to third-phase voltage command values based on the reference frequency and to output the first-phase to third-phase voltage command values to the first to third single-phase inverters, respectively.

Furthermore, the power inverter system according to another aspect of the present invention includes a phase difference calculating unit configured to calculate a phase difference between an output voltage and an output current of the power inverter system based on the first and second current command values and the first and second voltage command values. The power inverter system includes a voltage-correcting unit configured to calculate a correction voltage based on the phase difference, the reference frequency, and the first and second voltage command values and configured to add the calculated correction voltage to the first-phase to third-phase voltage commands. The correction voltage has a frequency three times as high as the reference frequency.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
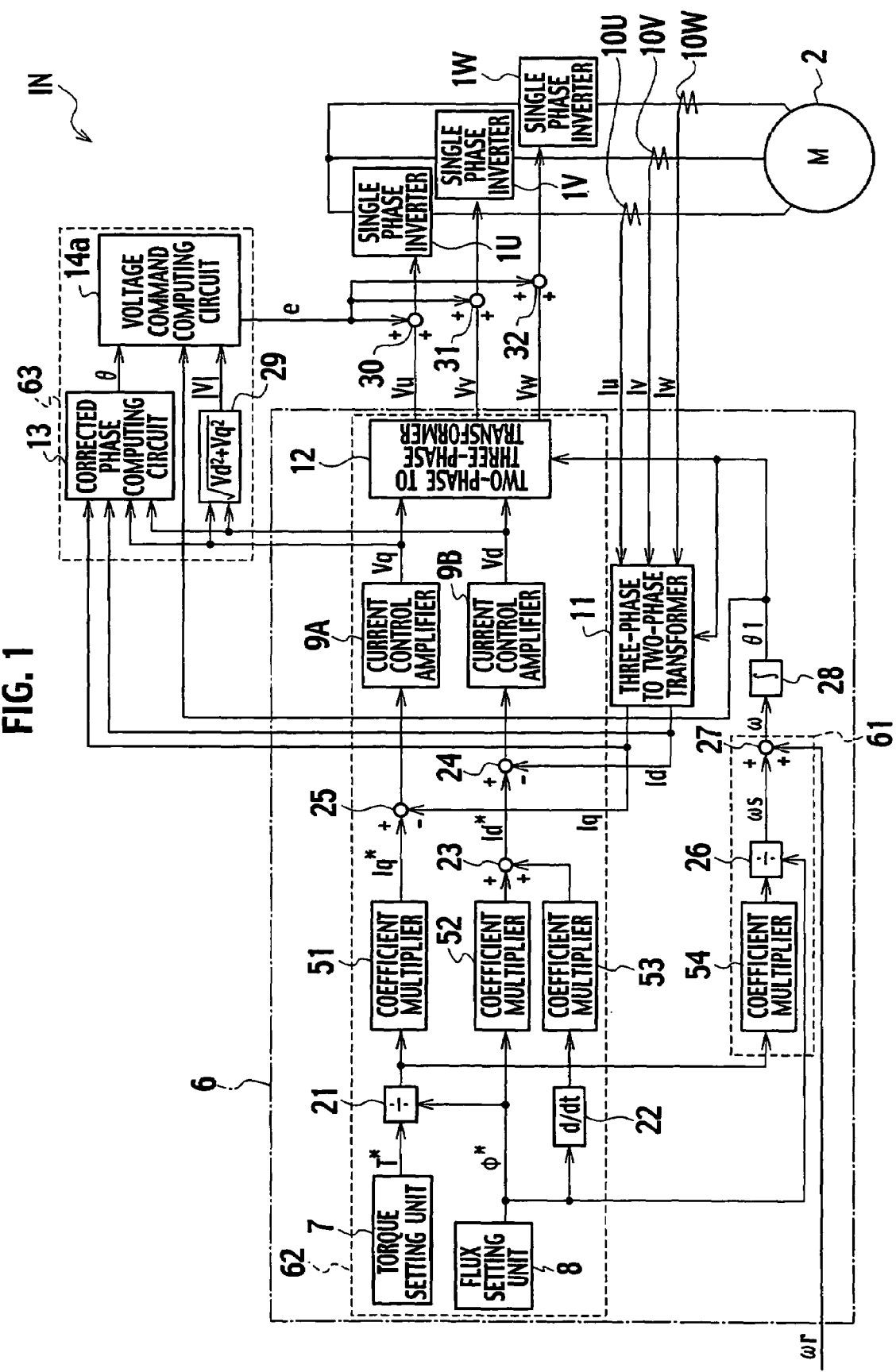
FIG. 1 is a circuit diagram schematically illustrating an example of the circuit structure of a power inverter system according to a first embodiment of the present invention.

FIG. 1 is a circuit diagram schematically illustrating an example of the circuit structure of a power inverter system according to a first embodiment of the present invention.

As illustrated in FIG. 1, the power inverter system IN according to the first embodiment includes a voltage and current command calculating circuit 6, each of single-phase inverters 1U, 1V, and 1W, which are three-phase star-connected to an AC motor 2, and current sensors (current transformers) 10U, 10V, and 10W. The current sensors 10U, 10V, and 10W are connected between the AC motor 2 and the single-phase inverters 1U, 1V, and 1W, respectively.

The voltage and current calculating circuit 6 can be composed of hardwired electronic circuits, a microcomputer programmed to perform voltage and current command calculating operations, or a combination of them.

The voltage and current command calculating circuit 6 includes a torque setting unit 7, a magnetic flux setting unit 8, dividers 21 and 26, a differentiator 22, adders 23 and 27, and subtracters 24 and 25. The voltage and current command calculating circuit 6 also includes an integrator 28, coefficient multipliers 51 to 54, current control amplifiers 9A and 9B, a three-phase to two-phase transformer (converter) 11, and a two-phase to three-phase transformer 12.

In the voltage and current command calculating circuit 6, the coefficient multiplier 54, the divider 26, and the adder 27 constitute reference-frequency calculating circuitry 61. In addition, the torque setting unit 7, the magnetic flux setting unit 8, the divider 21, the differentiator 22, the coefficient multipliers 51 to 53, the dividers 24 and 25, the current control amplifiers 9A and 9B, and the two-phase to three-phase transformer 12 constitute reference voltage calculating circuitry 62.

Furthermore, the power inverter system IN includes a voltage correcting circuit 63, and adders 30 to 32. The voltage correcting circuit 63 includes a corrected phase computing circuit 13, a voltage command correcting circuit 14a, and a scalar computing unit 29. The corrected phase computing circuit 13 can be composed of hardwired electronic circuits, a microcomputer programmed to perform voltage correction operations, or the combination of them.

Each of the single-phase inverters 1U, 1V, and 1W is designed as a multilevel single-phase inverter. In the first embodiment, each of the single-phase inverters 1U, 1V, and 1W is designed as a two-level single-phase inverter.

Figure 2:
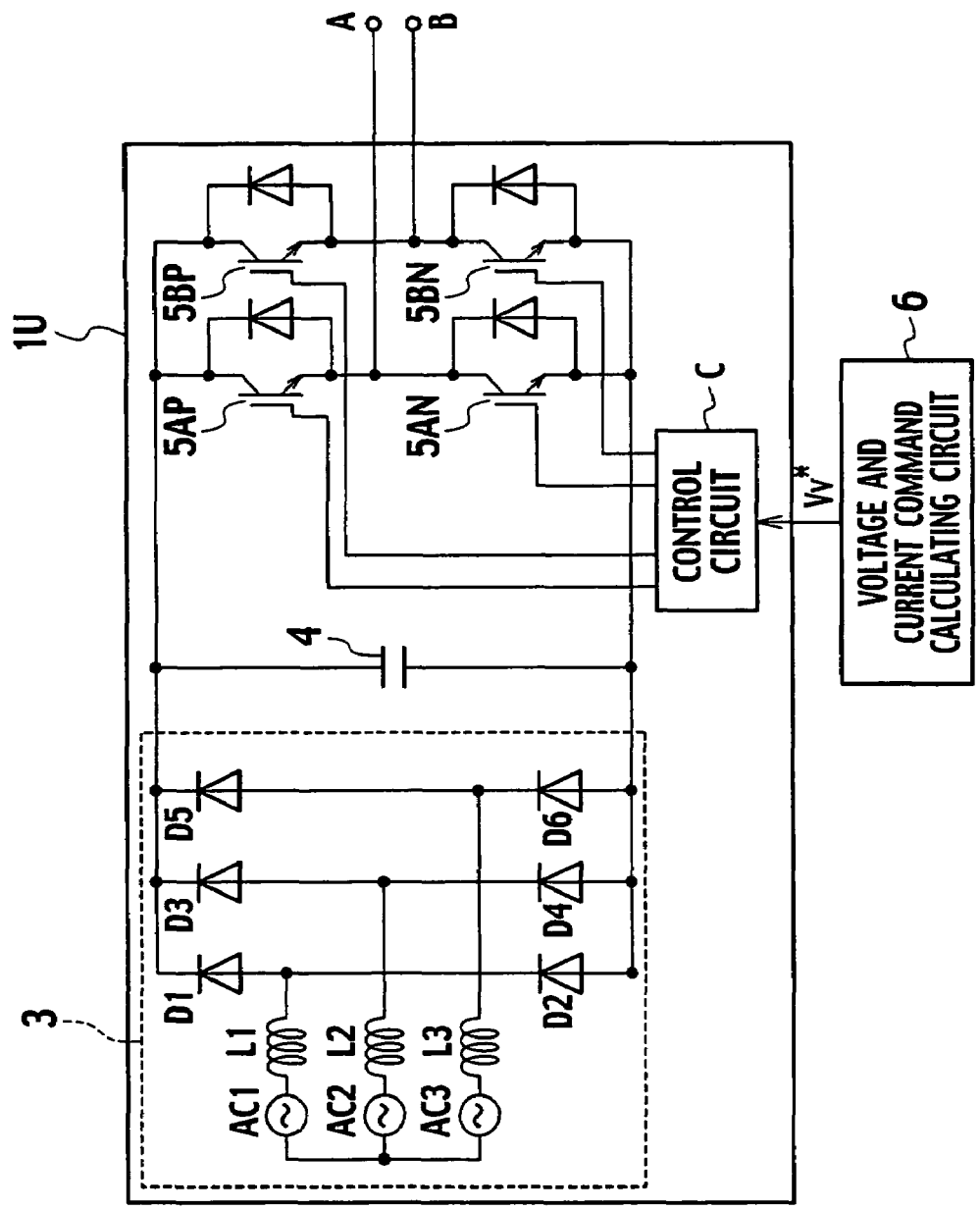
FIG. 2 is a circuit diagram schematically illustrating an example of the circuit structure of a single-phase inverter illustrated in FIG. 1.

Specifically, as illustrated in FIG. 2, the two-level single-phase inverter 1U is provided with a DC power source 3, a smoothing capacitor 4, and as switching elements 5AP, 5AN, 5BP, and 5BN, such as IGBTs (Insulated Gate Bipolar Transistors).

The inverter 1U is provided with a control circuit C electrically connected to a control terminal of each of the switching elements 5AP, 5AN, 5BP, and 5BN, such as the gate terminal of each of the IGBTs. The control circuit C is electrically connected to the voltage and current command calculating circuit 6.

The DC power source 3 is composed of AC power sources AC1, AC2, and AC3, which have different phases 0°, 120°, and 240°, respectively, and reactances L1 to L3 electrically connected to the AC power sources AC1 to AC3 in series, respectively. The DC power source 3 is also composed of diodes D1 to D6 operative to full-wave rectify alternating currents input from the reactances L1 to L3 to direct currents for each phase.

In the inverter 1U, load voltages, which are supplied from the AC power sources AC1 to AC3 and full-wave rectified by the diodes D1 to D6, are smoothed by a smoothing capacitor 4 to be converted into DC load voltages.

An output voltage command (command value) Vu* sent from the voltage and current command calculating circuit 6 and corrected by the voltage correcting circuit 63 allows the control circuit C to switch each of the switching elements 5AP, 5AN, 5BP, and 5BN on and off based on individual duties. This on and off control applied to each of the switching elements 5AP, 5AN, 5BP, and 5BN permits the switching elements 5AP, 5AN, 5BP, and 5BN to convert the DC load voltages to be converted into an AC voltage. The AC voltage is supplied to the AC motor 2 through output terminals A and B as a single-phase (U-phase) AC power.

Descriptions of the structure of the inverter 1V are omitted because the structure of the inverter 1V is substantially identical to that of the inverter 1U except in that an output voltage command (command value) Vu* allows the control circuit C to switch each of the switching elements 5AP, 5AN, 5BP, and 5BN of the inverter 1V on and off. Similarly, descriptions of the structure of the inverter 1W are omitted because the structure of the inverter 1W is substantially identical to that of the inverter 1U except in that an output voltage command (command value) Wu* allows the control circuit C to switch each of the switching elements 5AP, 5AN, 5BP, and 5BN of the inverter 1W on and off.

Next, operations of the power inverter system IN according to the first embodiment will be described hereinafter.

In the voltage and current calculating circuit 6 of the power inverter system IN, a torque command (command value) T* and an excitation command (command value) Φ* are set by the torque setting unit 7 and the magnetic flux setting unit 8.

The torque command T* is divided by the excitation command Φ* by the divider 21, and multiplied by a coefficient K1 by the coefficient multiplier 51, so that the torque command T* is converted into a current command (command value) Iq*.

The excitation command Φ* is multiplied by a coefficient K2 by the coefficient multiplier 52. In addition, the excitation command Φ* is differentiated by the differentiator 22, and multiplied by a coefficient K3 by the coefficient multiplier 53. Pieces of data generated by the coefficient multipliers 52 and 53 are added to each other by the adder 23, which generates a current command (command value) Id*.

The current commands Id* and Iq* are current commands that represent a current component in a d (direct) axis (magnetic axis) and in a q (quadrature) axis in a rotating coordinate system, respectively; this d axis and q axis are orthogonal to each other. In other words, the current commands Id* and Iq* are current commands to an excitation current component and a torque current component.

Current feedback signals Id and Iq are subtracted from the current commands Id* and Iq* by the subtracters 24 and 25, so that pieces of data obtained by the subtracters 24 and 25 are input to the current control amplifiers 9B and 9A, respectively.

The current control amplifier 9B adjusts a voltage command (command value) representing a voltage component in the d axis such that a phase difference between the excitation command Φ* and the current feedback signal Id is reduced to zero, thereby outputting the adjusted voltage command of the d axis, which is referred to "Vd".

Similarly, the current control amplifier 9A adjusts a voltage command (command value) representing a voltage component in the q axis such that a phase difference between the torque command T* and the current feedback signal Iq is reduced to zero, thereby outputting the adjusted voltage command of the q axis, which is referred to "Vq".

On the other hand, data generated by dividing the torque command T* by the excitation command Φ* by the divider 21 is input to the coefficient multiplier 54, so that the data is multiplied by a coefficient K4 by the coefficient multiplier 54. Data obtained by the coefficient multiplier 54 is divided by the excitation command Φ* by the divider 26, which generates a slip frequency $\omega_s$. To the slip frequency $\omega_s$, an angular rate $\omega_r$ is added to the slip frequency $\omega_s$, resulting that an output angular frequency ω for the fundamental of each of the output voltage and the output current from the power inverter system IN is determined.

The output angular frequency ω is input to the integrator 28 to be integrated thereby, which generates an output phase θ1.

On the other hand, three-phase current values Iu, Iv, and Iw are detected by the current detectors 10U, 10V, and 10W, respectively. Based on the three-phase current values Iu, Iv, and Iw, and the output phase θ1, the current feedback signals Id and Iq are obtained by the three-phase to two-phase transformer 11. Similarly, based on the voltage command Vd of the d axis and the voltage command Vq of the q axis, output voltages (reference voltages) Vu, Vv, and Vw are obtained by the two-phase to three-phase transformer 12.

Figure 3:
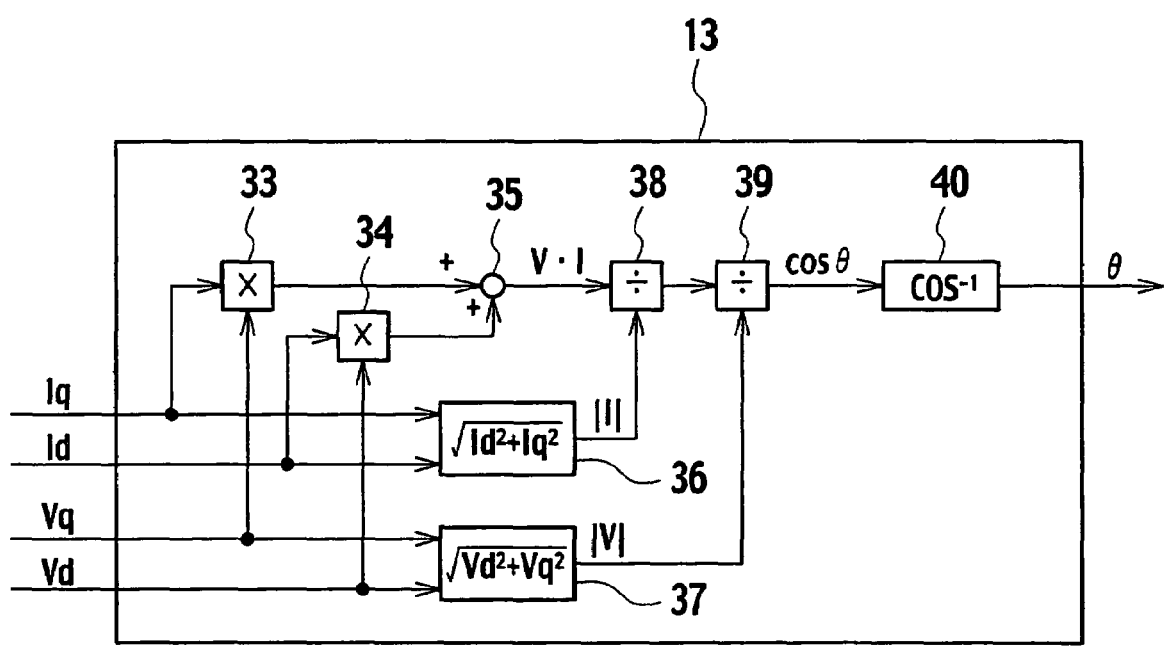
FIG. 3 is a block diagram schematically illustrating the inner structure of a corrected phase computing circuit illustrated in FIG. 1 in detail.

In the first embodiment of the present invention, to the three-phase output voltages Vu, Vv, and Vw obtained by the voltage and current command calculating circuit 6, correction voltage components for suppression of ripples are applied, respectively; these correction voltage components are obtained by the voltage correcting circuit 63. Corrected output voltages to which the correction voltage components are applied are fed, as the output voltage commands Vu*, Vv*, and Vw*, to the single-phase converters 1U, 1V, and 1W, respectively FIG. 3 illustrates the inner structure of the corrected phase computing circuit 13 in detail. Specifically, the corrected phase computing circuit 13 includes multipliers 33 and 34, an adder 35, scalar calculating units 36 and 37, dividers 38 and 39, and an arccosine (cosine$^{-1}$) calculating unit 40.

Operations of the corrected phase computing circuit 13 will be described hereinafter.

The first product of the voltage command Vq and the current feed back signal Iq is obtained by the multiplier 33, and the second product of the voltage command Vd and the current feedback signal Id is obtained by the multiplier 34. The first product and the second product are added to each other by the adder 35. These operations provide the scalar product of the voltage vector with the components Vd and Vq and the current vector with the components Id and Iq on the rotating coordinate system (on the rotating angle θ1) rotating at the predetermined angular rate (angular frequency) ω; this rotating coordinate system established by the voltage and current command calculating circuit 6. The scalar product is referred to as "V·I".

The scalar quantity |I| of the voltage vector I is obtained by the scalar calculating unit 36, and the scalar quantity |V| of the voltage vector V is obtained by the scalar calculating unit 37. The scalar product V·I is divided by the scalar quantity |I| by the divider 38, and sequentially divided by the scalar quantity |V| by the divider 39. These operations give a power factor (cosine (θ)) between the output voltage and the output current. Based on the power factor cosine (θ), an arccosine (cosine$^{-1}$) is calculated by the arccosine (cosine$^{-1}$) calculating unit 40, which provides a power factor angle θ between the output voltage and the output current.

Note that the operations of the corrected phase computing circuit 13 provide the power factor angle θ, but measurement of an actual output voltage and an actual output current can provide the power factor angle θ.

Figure 4:
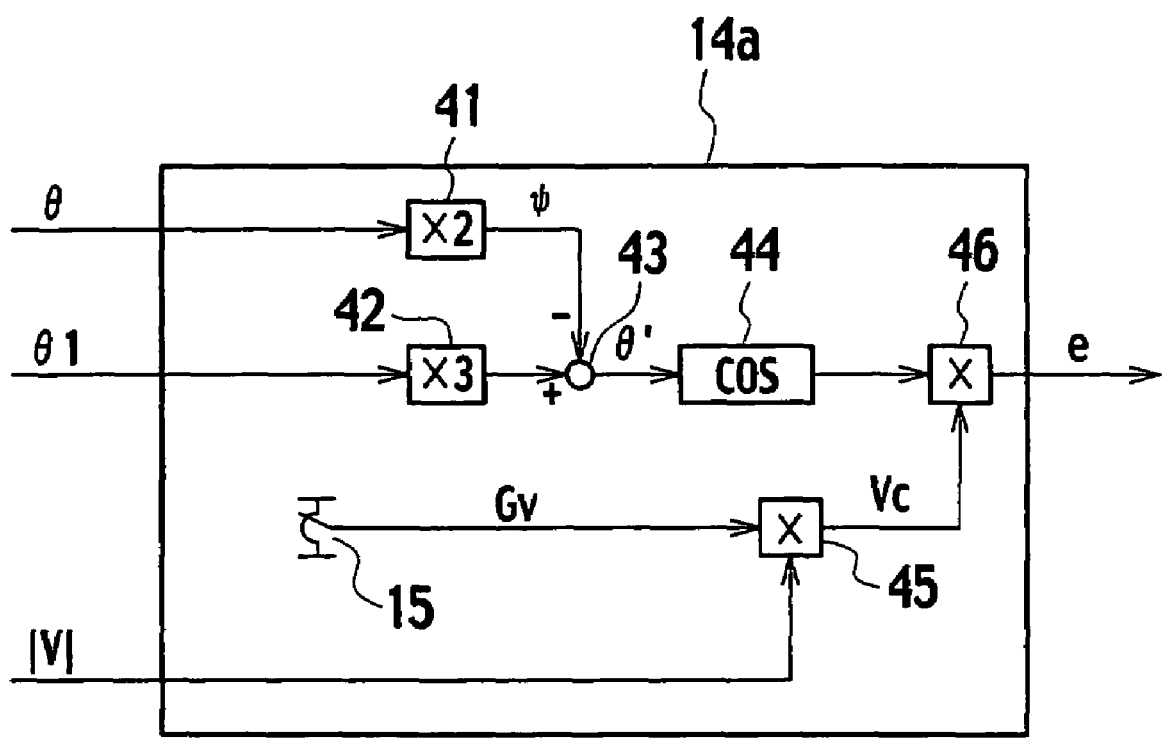
FIG. 4 is a block diagram schematically illustrating the inner structure of a voltage command correcting circuit illustrated in FIG. 1 in detail.

FIG. 4 illustrates the inner structure of the voltage command correcting circuit 14a in detail. Specifically, the voltage command correcting circuit 14a includes a correction gain setting unit 15, multipliers 41, 42, 45, and 46, a subtracter 43, and a cosine calculating unit 44.

Operations of the voltage command correcting circuit 14a will be described hereinafter.

A correction gain Gv is set by the correction gain setting unit 15. Multiplication of the amplitude |V| of a reference voltage and the gain Gv by the multiplier 45 provides a voltage Vc. The amplitude |V| of a reference voltage is obtained based on the voltage vector (Vd, Vq) by the scalar calculating unit 29.

The power factor angle (phase difference) θ provided by the corrected phase computing circuit 13 is multiplied by a phase-difference gain G, such as 2, by the multiplier 41 so that a phase angle (phase difference) φ of a correction voltage is obtained.

The rotating angle (output phase) θ1 of the reference voltage, which is obtained by the voltage and current command calculating circuit 6, is multiplied by 3 by the multiplier 42. Subtraction of the phase angle φ from the three-times rotating angle φ1 provides a corrected power factor (corrected phase) θ'.

The cosine of the corrected power factor θ' is calculated by the cosine calculating unit 44. Multiplication of the cosine θ' and the voltage Vc by the multiplier 46 provides a correction voltage "e" whose phase is θ' and whose amplitude is Vc.

In the adders 30 to 32, the correction voltage e is added to each of the reference voltages Vu, Vv, and Vw, which is obtained by the two-phase to three-phase transformer 12, making it possible to generate the corrected output voltage commands Vu*, Vv*, and Vw*.

In the first embodiment, when time is represented by "t", because the correction voltage e has an angular frequency 3ω three times as high as the angular frequency ω, the correction voltage e is represented by the following equations:

$$e = Vc \cdot \cos(3\omega t - \phi) \qquad \text{[Equation 1]}$$

$$\omega t = \theta 1 \qquad \text{[Equation 2]}$$

Thus, the voltages Vu*, Vv*, and Vw* applied to the single-phase inverters 1U, 1V, and 1W are represented by the following equations:

$$\begin{aligned} Vu^* &= Vu + e \\ &= |V| \cdot \cos(\omega t) + Vc \cdot \cos(3\omega t - \phi) \end{aligned} \qquad \text{[Equation 3]}$$

$$\begin{aligned} Vv^* &= Vv + e \\ &= |V| \cdot \cos\left(\omega t - \frac{2\pi}{3}\right) + Vc \cdot \cos(3\omega t - \phi) \end{aligned} \qquad \text{[Equation 4]}$$

$$\begin{aligned} Vw^* &= Vw + e \\ &= |V| \cdot \cos\left(\omega t + \frac{2\pi}{3}\right) + Vc \cdot \cos(3\omega t - \phi) \end{aligned} \qquad \text{[Equation 5]}$$

These equations allow the corrected U-phase momentary power Pu* to be represented as the following equation:

$$Pu^* = Pu + e \cdot |I| \cdot \cos(\omega t - \theta) \qquad \text{[Equation 6]}$$

where Pu represents U-phase momentary power out of consideration of ripple correction components, which is given by the following equation:

$$Pu = |V| \cdot |I| \cdot \{\cos(2\omega t - \theta) + \cos(\theta)\}/2 \qquad \text{[Equation 7]}$$

$$Pu^* = |V| \cdot |I| \cdot \{\cos(2\omega t - \theta) + \cos(\theta)\}/2 + |I| \cdot Vc \cdot \cos(3\omega t - \phi)\{\cos(\omega t - \theta)\}$$

These equations 6 and 7 permit the U-phase momentary power Pu* to be represented as the following equation:

$$= |V| \cdot |I| \cdot \{\cos(2\omega t - \theta) + \cos(\theta)\}/2$$
$$+ |I| \cdot Vc \cdot \{\cos(3\omega t + \omega t - \phi - \theta) + \cos(2\omega t - \phi + \theta)\}/2$$ [Equation 8]

$$= |V| \cdot |I| \cdot \{\cos(2\omega t - \theta) + \cos(\theta)\}/2$$ [Equation 9]
$$+ |I| \cdot Vc\{\cos(4\omega t - \phi - \theta) + \cos(2\omega t - \phi + \theta)\}/2$$ [Equation 10]

When the amplitude Vc is given by "Vc=−|V|", and the phase difference $\phi$ is given by "$\phi=2\theta$", the following equation can be obtained:

$$Pu^* = |V| \cdot |I| \cdot \{\cos(\theta) - \cos(4\omega t - 3\theta)\}/2$$ [Equation 11]

Similarly, the corrected V-phase momentary power Pu* and the W-phase momentary power Pw* are represented as the following equations, respectively:

$$Pv^* = |V| \cdot |I| \cdot \{\cos(\theta) - \cos(4\omega t - 2\pi/3 - 3\theta)\}/2$$ [Equation 12]

$$Pw^* = |V| \cdot |I| \cdot \{\cos(\theta) - \cos(4\omega t + 2\pi/3 - 3\theta)\}/2$$ [Equation 13]

As a comparative example with respect to the power inverter system IN according to the first embodiment, it is assumed that a power inverter system without using the voltage correcting circuit 63 and the adders 30 to 32, in other words, without using correction voltage components for suppression of ripples. In the power inverter system of the comparative example, output voltages Vu, Vv, and Vw, and output currents Iu, Iv, and Iw are represented by the following equations:

$$Vu = |V| \cdot \cos(\omega t)$$ [Equation 14]

$$Vv = |V| \cdot \cos\left(\omega t - \frac{2\pi}{3}\right)$$ [Equation 15]

$$Vw = |V| \cdot \cos\left(\omega t + \frac{2\pi}{3}\right)$$ [Equation 16]

$$Iu = |V| \cdot \cos(\omega t - \theta)$$ [Equation 17]

$$Iv = |V| \cdot \cos\left(\omega t - \frac{2\pi}{3} - \theta\right)$$ [Equation 18]

$$Iw = |V| \cdot \cos\left(\omega t + \frac{2\pi}{3} - \theta\right)$$ [Equation 19]

Figure 5A:
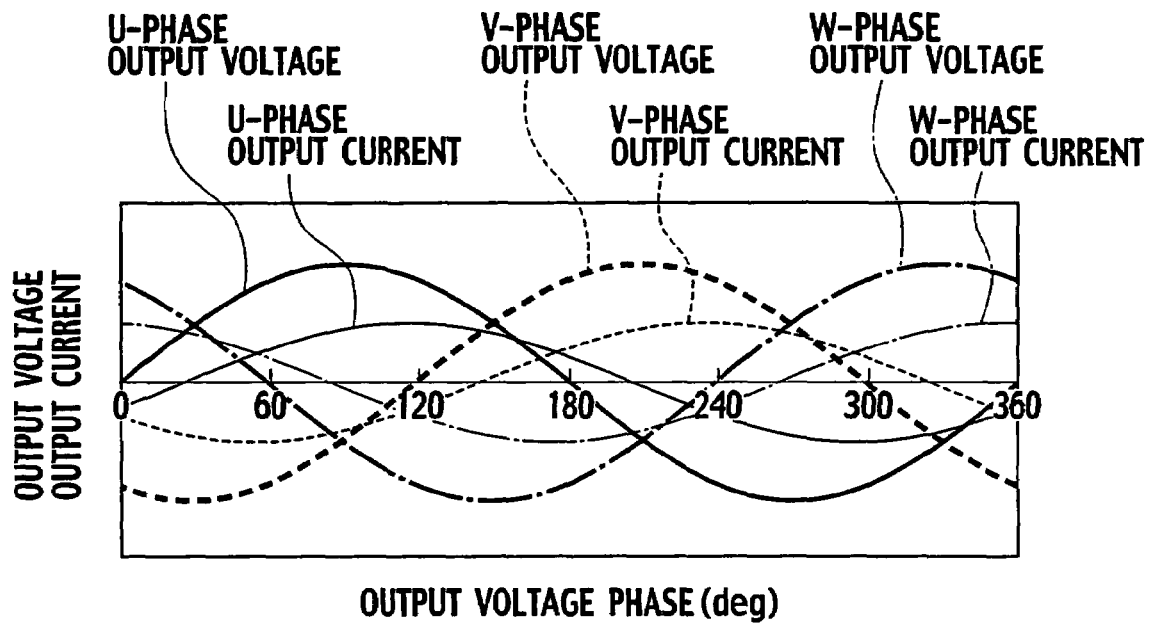
FIG. 5A is a graph schematically illustrating the waveform of an output voltage for each phase and that of an output current for each phase, which is obtained by a power inverter system according to a comparative example.
Figure 5B:
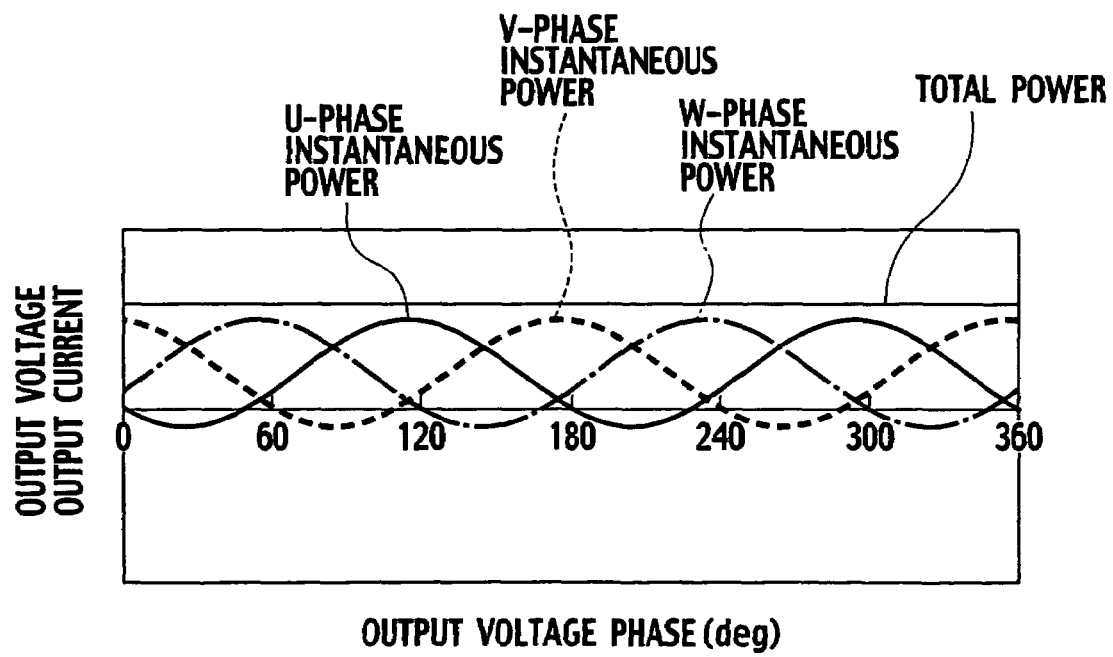
FIG. 5B is a graph schematically illustrating the waveform of momentary power for each phase, which is obtained by the power inverter system according to the comparative example.

FIG. 5A illustrates the waveform of the output voltage for each phase and that of the output current for each phase, which is obtained by the power inverter system according to the comparative example. FIG. 5B illustrates the waveform of the momentary power for each phase, which is obtained by the power inverter system according to the comparative example. The U-phase output voltage, the V-phase output voltage, and the W-phase output voltage have a phase difference of 120 degrees ($2\pi/3$ radian) from each other.

In addition, the U-phase output current, the V-phase output current, and the W-phase output current have the phase difference (power factor) of $\theta$ from each other. The total power obtained by adding the U-phase momentary power, the V-phase momentary power, and the W-phase momentary power is substantially constant in amplitude independently of time. Note that, when each of the single-phase inverters 1U, 1V, and 1W shares the single DC power source 3, even if the momentary power for each phase fluctuates, the power output from the DC power source 3 is constant in amplitude. This is because the total output power from the power inverting portion of the DC power source 3 is constant in time.

Thus, in the power inverter system of the comparative example, the U-phase momentary power Pu, the V-phase momentary power Pv, and the W-phase momentary power Pw are represented by the following equations:

$$Pu = |V| \cdot |I| \cdot \{\cos(2\omega t - \theta) + \cos(\theta)\}/2$$ [Equation 20]

$$Pv = |V| \cdot |I| \cdot \{\cos(2\omega t - 2\pi/3 - \theta) + \cos\theta\}/2$$ [Equation 21]

$$Pw = |V| \cdot |I| \cdot \{\cos(2\omega t + 2\pi/3 - \theta) + \cos(\theta)\}/2$$ [Equation 22]

This results in that the total power P obtained by adding the U-phase momentary power Pu, the V-phase momentary power Pv, and the W-phase momentary power Pw is represented by the following equation:

$$P = Pu + Pv + Pw = 3 \cdot |V| \cdot |I| \cdot \cos(\theta)/2$$ [Equation 23]

In each of the U-phase momentary power Pu, the V-phase momentary power Pv, and the W-phase momentary power Pw represented by the equations 20 to 22, the first term of each of the equations 20 to 22 corresponds to reactive power (reactive power component). Because the reactive power component has the angular frequency two times higher than the angular frequency $\omega$ and the power factor (phase difference) $\theta$, they become substantially sinusoidal ripples with the angular frequency of $2\omega$ and the phase difference of $\theta$. Specifically, the sinusoidal ripples appear in the DC voltage to be applied to each switching element of each of the single-phase inverters 1U, 1V, and 1W based on the amplitude of the reactive power component.

In the power inverter system IN according to the first embodiment, however, the correction voltage "e" has the angular frequency ($3\omega$) three times higher than the angular frequency $\omega$. Specifically, the correction voltage with the angular frequency $3\omega$ newly generates a ripple correction component with the angular frequency $2\omega$ two times as high as the angular frequency $\omega$; this ripple correction component corresponds to the reactive power component of each of the momentary power Pu*, momentary power Pv*, and momentary power Pw*. The newly generated ripple correction component allows the reactive power component with the angular frequency $2\omega$ of each of the momentary power Pu*, momentary power Pv*, and momentary power Pw* to be cancelled. This results in that it is possible to leave a component whose angular frequency ($4\omega$) is four times as high as the angular frequency $\omega$ in each of the momentary power Pu*, momentary power Pv*, and momentary power Pw*.

That is, it is possible to make the difference between the resonance frequency of each inverter and the frequency ($4\omega$) of the remaining component (ripple component) of the first embodiment larger than that of the resonance frequency of each inverter and the frequency ($2\omega$) of the ripple component (reactive power component) of the comparative example. This allows the magnitude of the voltage ripples to be reduced.

In the first embodiment, in the total power P* consisting the sum of the momentary power Pu*, momentary power Pv*, and momentary power Pw*, because the sum of the second term of each of the equations 9 to 11 becomes zero, the following equation is effected:

$$P^* = Pu^* + Pv^* + Pw^* = 3 \cdot |V| \cdot |I| \cdot \cos(\theta)$$ [Equation 24]

This makes it clear that the total power P* is substantially identical to the total power P with no correction voltage components (see the equation 23).

Figure 6:
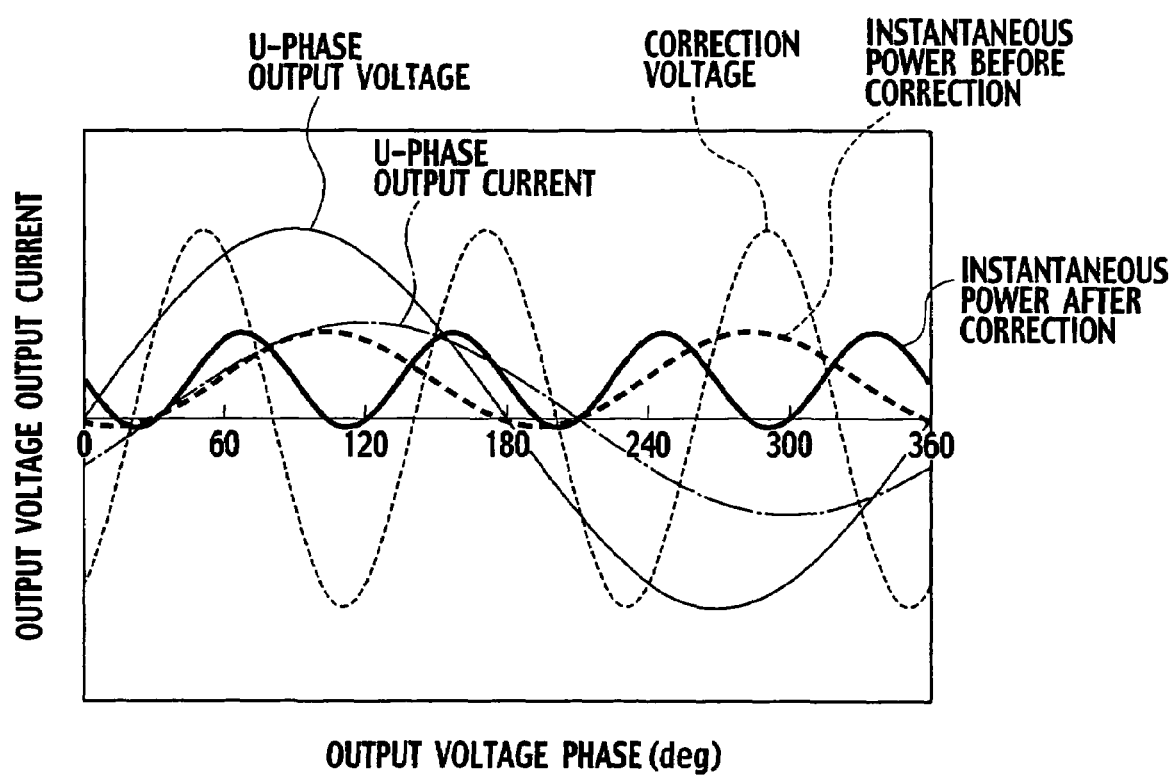
FIG. 6 is a graph schematically illustrating examples of waveforms of a U-phase output voltage, a U-phase output current, U-phase momentary power before voltage ripple correction, a correction voltage for reducing voltage ripples, and U-phase momentary power after voltage ripple correction according to the first embodiment.

Let us look at FIG. 6 illustrating examples of waveforms of the U-phase output voltage, U-phase output current, U-phase momentary power before voltage ripple correction, correction voltage for reducing voltage ripples, and U-phase momentary power after voltage ripple correction. As illustrated in FIG. 6, the frequency of the momentary power after voltage ripple correction is four times as high as that of the fundamental (each of the U-phase output voltage and the U-phase output current). This makes it possible to expand the difference between the resonance frequency of each inverter and the frequency (4ω) of the remaining component (ripple component) of the first embodiment.

Second Embodiment

Figure 7:
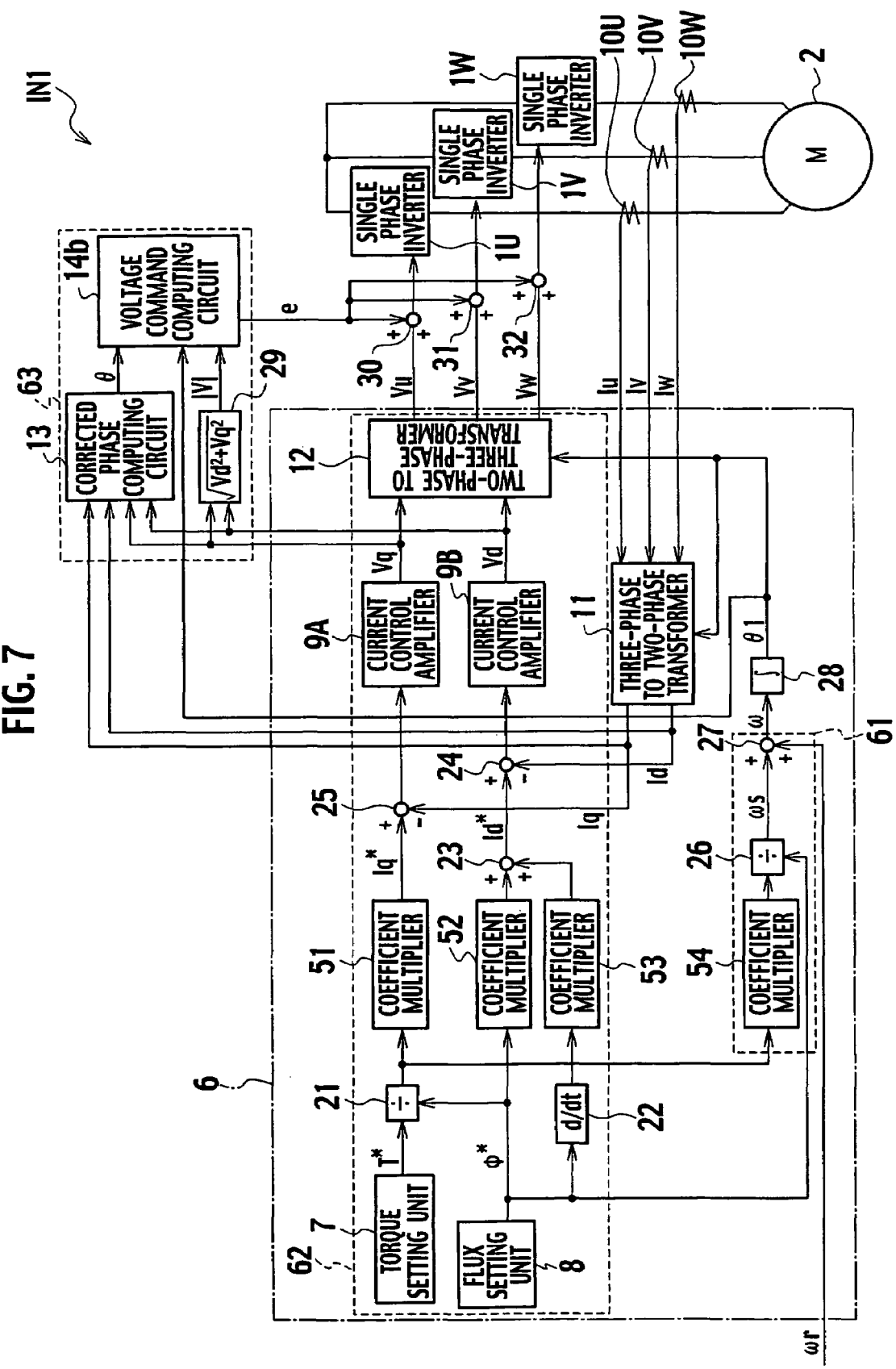
FIG. 7 is a circuit diagram schematically illustrating an example of the circuit structure of a power inverter system according to a second embodiment of the present invention.
Figure 8:
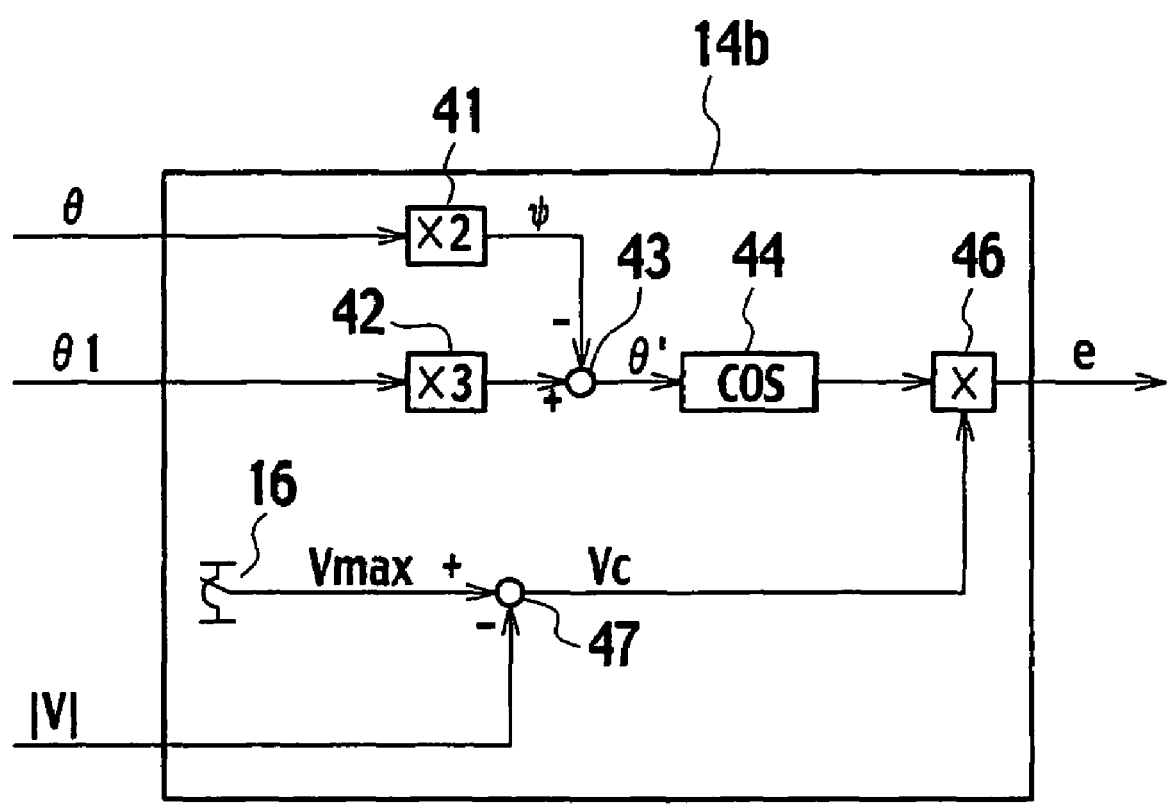
FIG. 8 is a block diagram schematically illustrating the inner structure of a voltage command correcting circuit illustrated in FIG. 7 in detail.

FIG. 7 schematically illustrates an example of the circuit structure of a power inverter system IN1 according to a second embodiment of the present invention, and FIG. 8 schematically illustrates the inner structure of a voltage command correcting circuit 14b illustrated in FIG. 7 in detail;

Note that elements of the power inverter system IN1 according to the second embodiment, which are substantially identical to those of the power inverter system IN according to the first embodiment shown in FIGS. 1 to 4, are represented by the same reference characters as in FIGS. 1 to 4. The descriptions of the elements of the power inverter system IN1 according to the second embodiment are therefore omitted or simplified.

A difference point of the power inverter system IN1 according to the second embodiment and the power inverter system IN according to the first embodiment is that a voltage command correcting circuit 14b is provided in the voltage correcting circuit 63 in place of the voltage command correcting circuit 14a.

The voltage command correcting circuit 14b has the same elements 41 to 44 as those of the voltage command correcting circuit 14a.

In addition, the voltage command correcting circuit 14b has a maximum voltage setting unit 16 configured to set the maximum voltage Vma that the power inverter system IN1 is capable of outputting, and a subtracter 47. The voltage command correcting circuit 14b is configured to limit the maximum voltage Vma, thereby obtaining an amplitude Vc of a correction voltage "e".

Specifically, in the voltage command correcting circuit 14b, the maximum voltage Vma is set by the maximum voltage setting unit 16, and from the maximum voltage Vmax, the scalar amplitude |V| of the voltage vector V (Vd, Vq) is subtracted by the subtracter 47.

A voltage obtained by the subtraction by the subtracter 47 is multiplied as the amplitude Vc of the correction voltage by the corrected power factor (corrected phase) θ' by the multiplier 46, which provides the correction voltage "e" whose phase is θ' and whose amplitude is Vc.

Other operations of the power inverter system IN1 are substantially identical to those of the power inverter system IN according to the first embodiment, thus omitting them.

As described above, in the power inverter system IN1 according to the second embodiment, limiting the maximum voltage Vma that the system IN1 can output by the scalar amplitude |V| suppresses ripples of the momentary power for each phase.

Figure 9:
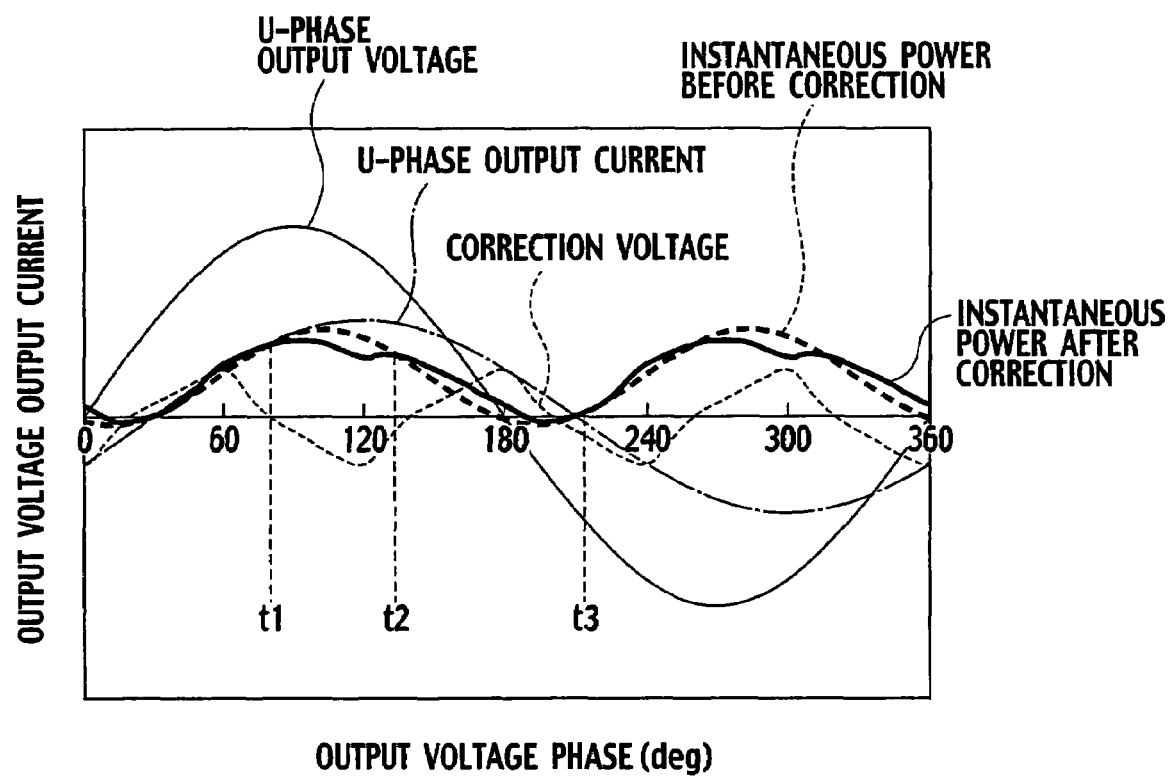
FIG. 9 is a graph schematically illustrating examples of waveforms of a U-phase output voltage, a U-phase output current, U-phase momentary power before voltage ripple correction, a correction voltage for reducing voltage ripples, and U-phase momentary power after voltage ripple correction according to the second embodiment.

When the modulation factor "Vmax/|V|" to the U-phase is set to 1.15, examples of waveforms of the U-phase output voltage, U-phase output current, U-phase momentary power before voltage ripple correction, correction voltage for reducing voltage ripples, and U-phase momentary power after voltage ripple correction according to the second embodiment are illustrated in FIG. 9. Like the first embodiment, note that the phase difference φ is given by "φ=2θ" in the second embodiment.

As illustrated in FIG. 9, the amplitude of the U-phase momentary power after voltage ripple correction in the interval from the time t1 to the later time t2 is smaller than that of the U-phase momentary power before voltage ripple correction in the same interval. The amplitude of the U-phase momentary power after voltage ripple correction in the next interval from the time t2 to the later time t3 is however larger than that of the U-phase momentary power before voltage ripple correction in the same interval.

Specifically, in the second embodiment, for example, the voltage obtained by subtracting the amplitude |V| of the momentary power before voltage ripple correction in the interval from the time t1 to the time t2 is added, as the amplitude Vc in the next interval from the time t2 to the time t3, to the momentary power before voltage ripple correction in the same interval from the time t2 to the time t3.

This makes it possible to correct the momentary power such that the amount of power that has been subtracted from the momentary power in the interval of the time t1 to the time t2 is added thereto in the next interval of the time t2 to the time t3.

As set forth above, in the second embodiment, the voltage command correcting circuit 14b is configured to add, to the momentary power before voltage ripple correction, the correction voltage whose amplitude is obtained by subtracting the amplitude |V| of the momentary power before voltage ripple correction from the maximum voltage Vmax. The configuration of the voltage command correcting circuit 14b allows the peaks of the momentary power after voltage ripple correction to be dispersed, as compared with the momentary power before voltage ripple correction. This makes it possible to reduce both the magnitude of ripples appearing in the momentary power and fluctuations in the DC voltage to be applied to each switching element of each of the single-phase inverters 1U, 1V, and 1W.

Third Embodiment

Figure 10:
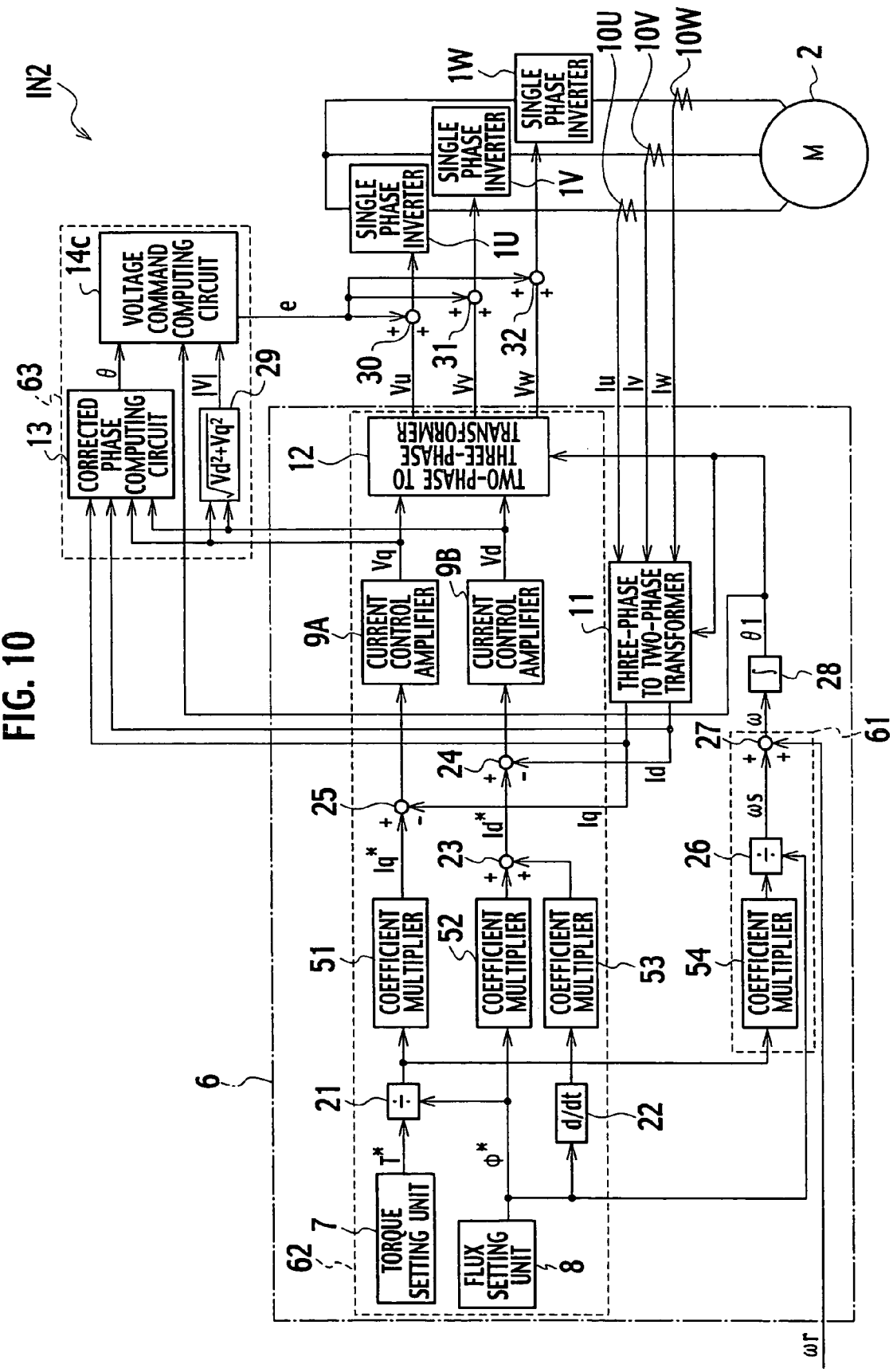
FIG. 10 is a circuit diagram schematically illustrating an example of the circuit structure of a power inverter system according to a third embodiment of the present invention.
Figure 11A:
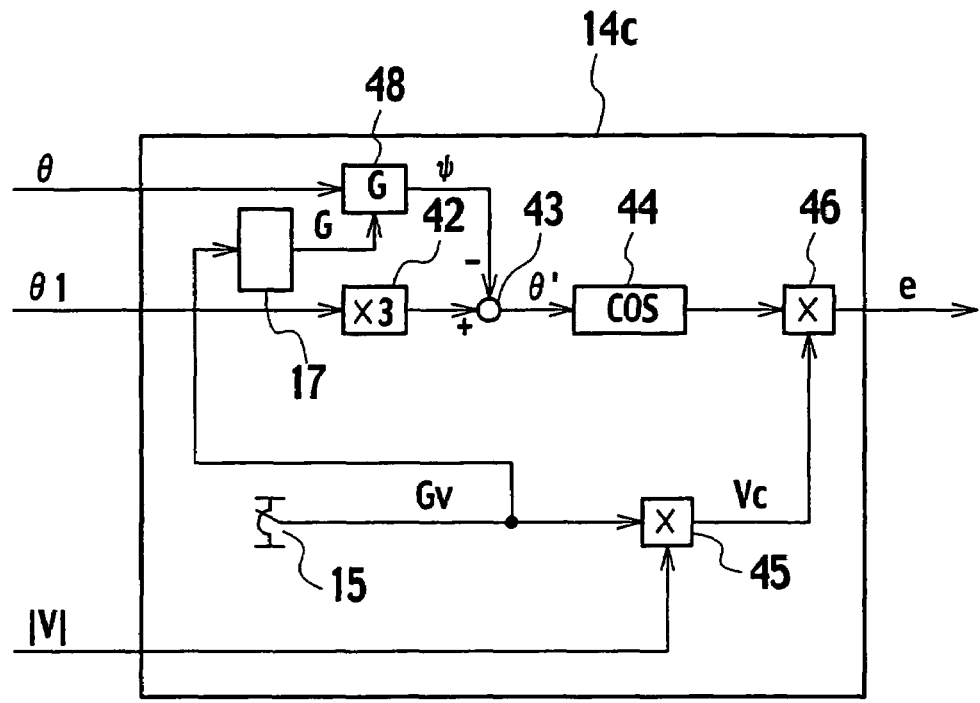
FIG. 11A is a block diagram schematically illustrating the inner structure of a voltage command correcting circuit illustrated in FIG. 10 in detail.

FIG. 10 schematically illustrates an example of the circuit structure of a power inverter system IN2 according to a third embodiment of the present invention, and FIG. 11A schematically illustrates the inner structure of a voltage command correcting circuit 14c illustrated in FIG. 11A in detail.

Note that elements of the power inverter system IN2 according to the third embodiment, which are substantially identical to those of the power inverter system IN according to the first embodiment shown in FIGS. 1 to 4, are represented by the same reference characters as in FIGS. 1 to 4. The descriptions of the elements of the power inverter system IN2 according to the third embodiment are therefore omitted or simplified.

A difference point of the power inverter system IN2 according to the third embodiment and the power inverter system IN according to the first embodiment is that a voltage command correcting circuit 14c is provided in the voltage correcting circuit 63 in place of the voltage command correcting circuit 14a.

The voltage command correcting circuit 14c has the same elements 15, and 42 to 46 as those of the voltage command correcting circuit 14a.

In addition, the voltage command correcting circuit 14c has a corrected-phase gain calculating unit 17 configured to determine a phase-difference gain G with respect to the power factor angle (phase difference) θ based on the correction gain Gv set by the correction gain setting unit 15. The voltage command correcting circuit 14c also has a gain multiplier 48 in place of the multiplier 41.

The gain multiplier 48 is configured to multiply the power factor angle (phase difference) θ provided by the corrected phase computing circuit 13 by the phase-difference gain G, thereby uniquely obtaining the phase angle (phase difference) φ of the correction voltage according to the third embodiment.

Specifically, in the voltage command correcting circuit 14c illustrated in FIG. 11A, the phase-difference gain G with respect to the power factor angle θ is calculated by the corrected-phase gain calculating unit 17 based on the correction gain Gv set by the correction gain setting unit 15 in accordance with the following equation:

$$G = 1 + Gv \qquad \text{[Equation 25]}$$

The power factor angle (phase difference) θ provided by the corrected phase computing circuit 13 is multiplied by the phase-difference gain G by the gain multiplier 48 so that the phase angle (phase difference) φ of the correction voltage is obtained.

The rotating angle (output phase) θ1 of the reference voltage, which is obtained by the voltage and current command calculating circuit 6, is multiplied by 3 by the multiplier 42. Subtraction of the phase angle φ from the three-times rotating angle θ1 provides a corrected power factor (corrected phase) θ'.

Other operations of the power inverter system IN2 are substantially identical to those of the power inverter system IN according to the first embodiment, and further description of which has been omitted.

Figure 12A:
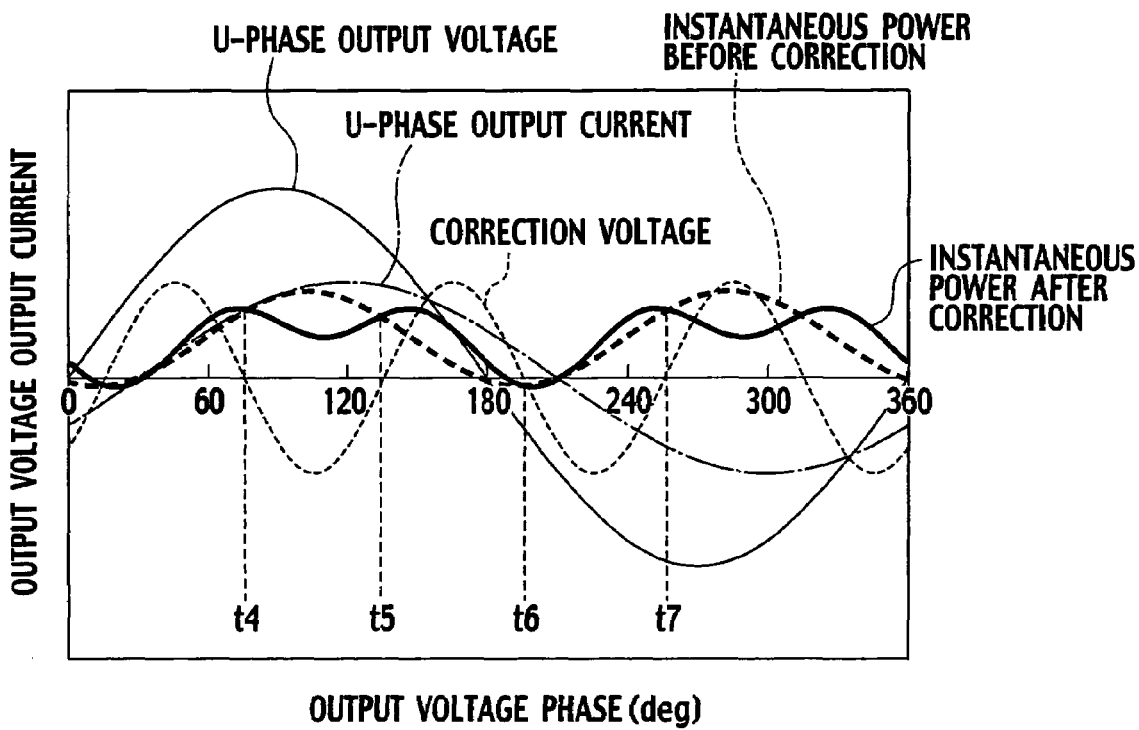
FIG. 12A is a graph schematically illustrating examples of waveforms of a U-phase output voltage, a U-phase output current, U-phase momentary power before voltage ripple correction, a correction voltage for reducing voltage ripples, and U-phase momentary power after voltage ripple correction when a correction gain Gv is set to 0.5 according to the third embodiment.

When the correction gain Gv is set to 0.5, the phase-difference gain G is set to 1.5, and the amplitude Vc is set to 0.5×|V|, examples of waveforms of the U-phase output voltage, U-phase output current, U-phase momentary power before voltage ripple correction, correction voltage for reducing voltage ripples, and U-phase momentary power after voltage ripple correction according to the third embodiment are illustrated in FIG. 12A.

Figure 12B:
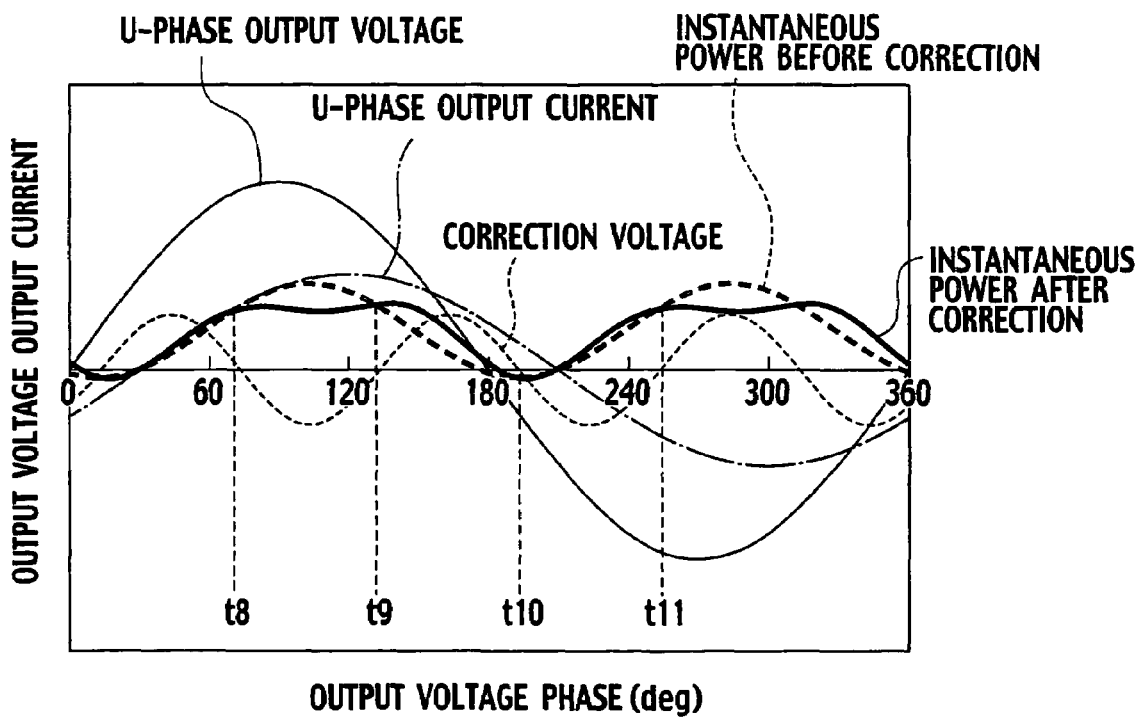
FIG. 12B is a graph schematically illustrating another example of waveforms of a U-phase output voltage, a U-phase output current, U-phase momentary power before voltage ripple correction, a correction voltage for reducing voltage ripples, and U-phase momentary power after voltage ripple correction when the correction gain Gv is set to 0.3 according to the third embodiment.
Figure 13:
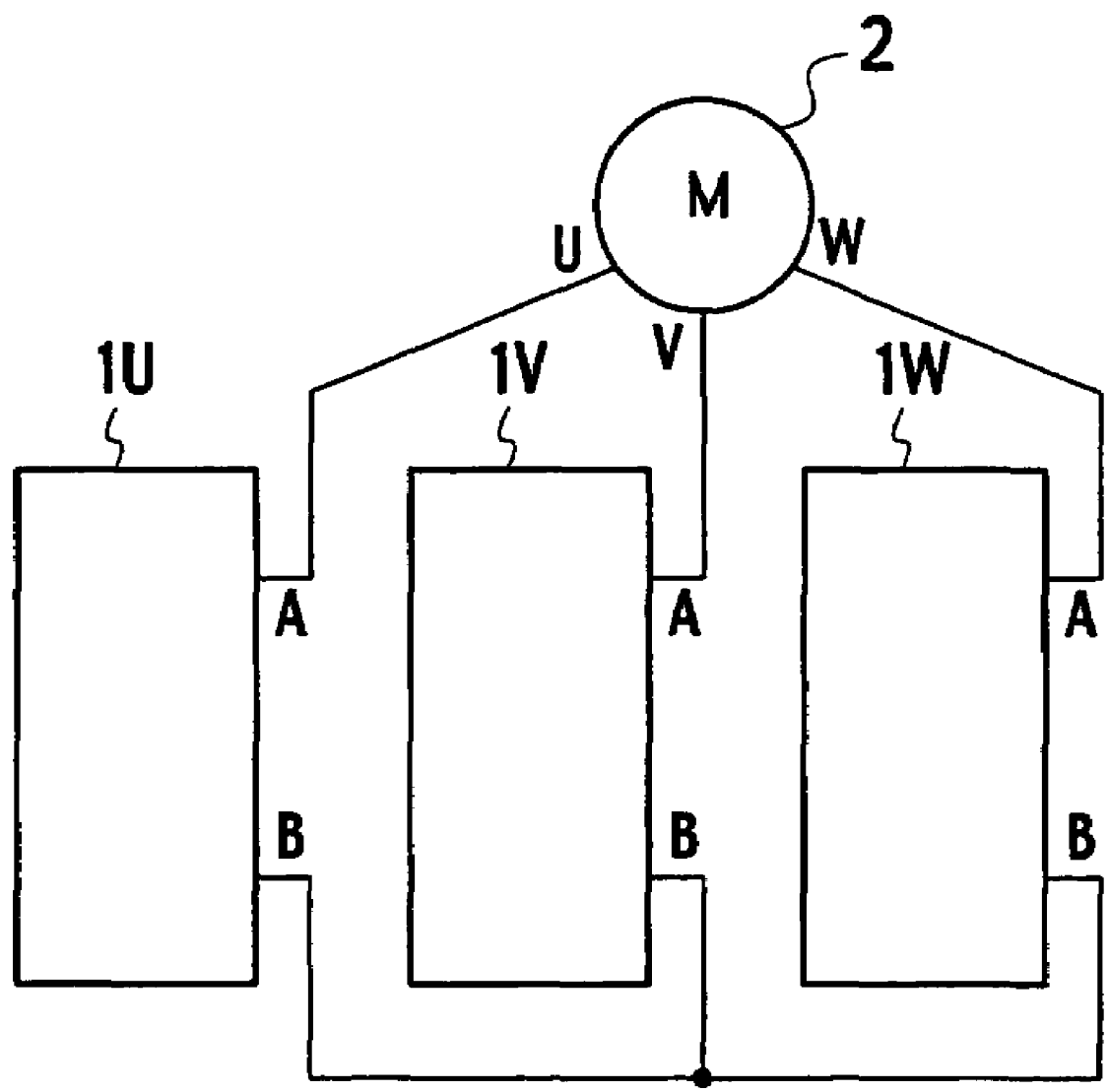
FIG. 13 is a block diagram schematically illustrating an example of the structure of a multilevel inverter with three single-phase inverters.

Similarly, when the correction gain Gv is set to 0.3, the phase-difference gain G is set to 1.3, and the amplitude Vc is set to 0.3×|V|, examples of waveforms of the U-phase output voltage, U-phase output current, U-phase momentary power before voltage ripple correction, correction voltage for reducing voltage ripples, and U-phase momentary power after voltage ripple correction according to the third embodiment are also illustrated in FIG. 12B.

As illustrated in FIG. 12A, the amplitude of the U-phase momentary power after voltage ripple correction in the interval from the time t4 to the later time t5 is smaller than that of the U-phase momentary power before voltage ripple correction in the same interval. The amplitude of the U-phase momentary power after voltage ripple correction in each of the interval from the time t5 to the later time t6 and that from the time t6 to the later time t7 is however larger than that of the U-phase momentary power before voltage ripple correction in each of the same intervals.

Similarly, as illustrated in FIG. 12B, the amplitude of the U-phase momentary power after voltage ripple correction in the interval from the time t8 to the later time t9 is smaller than that of the U-phase momentary power before voltage ripple correction in the same interval. The amplitude of the U-phase momentary power after voltage ripple correction in each of the interval from the time t9 to the later time t10 and that from the time t10 to the later time t11 is however larger than that of the U-phase momentary power before voltage ripple correction in each of the same intervals.

Specifically, in the third embodiment, for example, the phase difference (power factor angle) θ is corrected to the corrected power factor (corrected phase) θ' based on the phase angle φ of the correction voltage.

This allows the phase of the momentary power before voltage ripple correction to change. For example, correcting the phase of the momentary power before voltage ripple correction allows the peak thereof in the interval of the time t4 to the time t5 to shift. This allows the peak of the momentary power before voltage ripple correction in the interval of the time t4 to the time t5 to shift in the interval from the time t5 to the time t6 and/or that from the time t6 to the time t7 of the momentary power after voltage ripple correction. This makes it possible to disperse the peaks of the momentary power after voltage ripple correction, as compared with the momentary power before voltage ripple correction.

Note that, in the third embodiment, as illustrated in FIGS. 12A and 12B, the momentary power contains the second harmonics whose frequency is two times the frequency of the fundamental (U-phase output voltage, U-phase output current), and the fourth harmonics whose frequency is four times the frequency of the fundamental. Dispersing the peaks of the momentary power after voltage ripple correction as compared with the momentary power before voltage ripple correction allows suppression of both the magnitude of ripples appearing in the momentary power and fluctuations in the DC voltage to be applied to each switching element of each of the single-phase inverters 1U, 1V, and 1W.

Figure 11B:
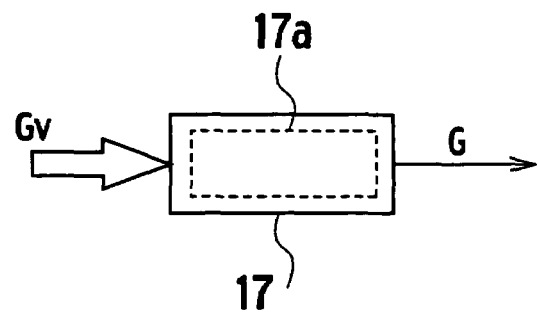
FIG. 11B is a block diagram schematically illustrating a functional table provided in a corrected-phase gain calculating unit illustrated in FIG. 10.

As a modification of the third embodiment, the corrected-phase gain calculating unit 17 can include a function table 17a illustrated in FIG. 11B.

Specifically, while the correction gain Gv is changed as a parameter, phase-difference gains G corresponding to the changed correction gains Gv have been previously measured. The one-to-one correspondence between each of the correction gains Gv and each of the phase-difference gains G has been stored as function data in the functional table 17a.

In the modification, when one of the correction gains Gv is set by the correction gain setting unit 15, the corrected-phase gain calculating unit 17 instantly obtains corresponding one of the phase-difference gains G without calculating it. This modification makes it possible to obtain the phase angle φ of the correction voltage in real time in addition to the effects of the third embodiment.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A power inverter system comprising:
    an inverter unit including first to third single-phase inverters, each of the first to third single-phase inverters comprising:
        a direct current power source;
        a smoothing circuit connected in parallel to the direct current power source; and
        a plurality of switching elements connected in parallel to the direct current power source;
    a reference current setting unit configured to set a first reference current command value representing a first reference current component in a first axis, and a second reference current command value representing a second reference current component in a second axis, the first axis and the second axis being orthogonal to each other;

a reference-frequency calculating unit configured to calculate a reference frequency of each of the first to third single-phase inverters;

a first converter configured to convert first to third output currents from the first to third single-phase inverters into a first current command value representing a first output current component in the first axis and a second current command representing a second output current component in the second axis;

a first subtracter configured to subtract the first current command value from the first reference current command value;

a second subtracter configured to subtract the second current command value from the second reference current component;

a first current control amplifier configured to adjust a first voltage command value representing a first voltage component in the first axis such that the difference between the first reference current command value and the first current command value is reduced to zero based on the subtraction result by the first subtracter;

a second current control amplifier configured to adjust a second voltage command value representing a second voltage component in the second axis such that the difference between the second reference current command value and the second current command value is reduced to zero based on the subtraction result by the second subtracter;

a second converter configured to convert the first and second voltage command values into first-phase to third-phase voltage command values based on the reference frequency and to output the first-phase to third-phase voltage command values to the first to third single-phase inverters, respectively;

a phase difference calculating unit configured to calculate a phase difference between an output voltage and an output current of the power inverter system based on the first and second current command values and the first and second voltage command values; and a voltage-correcting unit configured to calculate a correction voltage based on the phase difference, the reference frequency, and the first and second voltage command values and configured to add the calculated correction voltage to the first-phase to third-phase voltage commands, the correction voltage having a frequency three times as high as the reference frequency.

2. A power inverter system according to claim 1, wherein the voltage-correcting unit is configured to calculate a phase two times larger than the phase difference and to determine the calculated angle as a phase of the correction voltage.

3. A power inverter system according to claim 1, wherein the voltage-correcting unit is configured to determine the correction voltage such that an amplitude of the correction voltage is equal to or lower than a maximum voltage that the power inverter system is capable of outputting.

4. A power inverter system according to claim 1, wherein the voltage-correcting unit further comprises:

a first unit configured to obtain an amplitude of the correction voltage based on an amplitude of the reference voltage and a predetermined gain; and a second unit configured to multiply the predetermined gain and the phase difference calculated by the phase difference calculating unit to obtain a phase, thereby determining the obtained phase as a phase of the correction voltage.

5. A method of correcting a voltage supplied to a power inverter system, the power inverter system including an inverter unit having first to third single-phase inverters, each of the first to third single-phase inverters having a direct current power source, a smoothing circuit connected in parallel to the direct current power source, and a plurality of switching elements connected in parallel to the direct current power source, the method comprising:

setting a first reference current command value representing a first reference current component in a first axis, and a second reference current command value representing a second reference current component in a second axis, the first axis and the second axis being orthogonal to each other;

calculating a reference frequency of each of the first to third single-phase inverters;

converting first to third output currents from the first to third single-phase inverters into a first current command value representing a first output current component in the first axis and a second current command representing a second output current component in the second axis;

subtracting the first current command value from the first reference current command value;

subtracting the second current command value from the second reference current component;

adjusting a first voltage command value representing a first voltage component in the first axis such that the difference between the first reference current command value and the first current command value is reduced to zero based on the subtraction result by the first subtracter;

adjusting a second voltage command value representing a second voltage component in the second axis such that the difference between the second reference current command value and the second current command value is reduced to zero based on the subtraction result by the second subtracter;

converting the first and second voltage command values into first-phase to third-phase voltage command values based on the reference frequency and to output the first-phase to third-phase voltage command values to the first to third single-phase inverters, respectively;

calculating a phase difference between an output voltage and an output current of the power inverter system based on the first and second current command values and the first and second voltage command values; and calculating a correction voltage based on the phase difference, the reference frequency, and the first and second voltage command values and configured to add the calculated correction voltage to the first-phase to third-phase voltage commands, the correction voltage having a frequency three times as high as the reference frequency.

* * * * *